United States Patent
Dietrich et al.

(10) Patent No.: US 10,239,794 B2
(45) Date of Patent: Mar. 26, 2019

(54) α/β-SIALON HAVING IMPROVED SINTERING ACTIVITY AND HIGH EDGE STRENGTH

(71) Applicant: CeramTec GmbH, Plochingen (DE)

(72) Inventors: Volker Dietrich, Mannheim (DE); Moritz Stahl, Unterensingen (DE); Kilian Friederich, Plochingen (DE); Gert Richter, Königsbach-Stein (DE)

(73) Assignee: CERAMTEC GMBH, Plochingen (DE)

( * ) Notice: Subject to any disclaimer, the term of this patent is extended or adjusted under 35 U.S.C. 154(b) by 0 days.

(21) Appl. No.: 15/535,013

(22) PCT Filed: Dec. 10, 2015

(86) PCT No.: PCT/EP2015/079247
§ 371 (c)(1),
(2) Date: Jun. 9, 2017

(87) PCT Pub. No.: WO2016/092016
PCT Pub. Date: Jun. 16, 2016

(65) Prior Publication Data
US 2017/0362131 A1 Dec. 21, 2017

(30) Foreign Application Priority Data

Dec. 12, 2014 (DE) .................. 10 2014 018 283
Nov. 18, 2015 (DE) .................. 10 2015 222 790

(51) Int. Cl.
*C04B 35/599* (2006.01)
*C04B 35/597* (2006.01)
(Continued)

(52) U.S. Cl.
CPC ............ *C04B 35/597* (2013.01); *C04B 35/64* (2013.01); *C04B 35/645* (2013.01); *F01N 13/08* (2013.01);
(Continued)

(58) Field of Classification Search
CPC .................................................... C04B 35/597
See application file for complete search history.

(56) References Cited

U.S. PATENT DOCUMENTS 4,407,970 A    10/1983  Komatsu et al.
4,547,470 A *  10/1985  Tanase .................. C04B 35/597
                                                              264/122
(Continued)

FOREIGN PATENT DOCUMENTS

EP    0 171 444 A1    2/1986
EP    2891640 A1 *    7/2015    ........... C04B 35/597
(Continued)

OTHER PUBLICATIONS

International Search Report for PCT/EP2015/079247 dated Mar. 4, 2016; English translation submitted herewith (7 Pages).
(Continued)

*Primary Examiner* — Karl E Group
(74) *Attorney, Agent, or Firm* — Fitch, Even, Tabin & Flannery LLP

(57) ABSTRACT

A sintered molded article includes a ceramic of α/β-sialon having a grain boundary phase, the grain boundary phase containing at least one hard material formed in situ as an additional phase. A method for the production of the sintered molded article uses at least the following compounds as a starting material: $Si_3N_4$, AlN, and, if applicable, $Al_2O_3$, at least one oxide of the rare earths, and at least one oxide of the element titanium.

22 Claims, 1 Drawing Sheet

(51) Int. Cl.
*C04B 35/645* (2006.01)
*C04B 35/64* (2006.01)
*F01N 13/08* (2010.01)
*F02B 37/18* (2006.01)
*B23B 27/14* (2006.01)
*F16C 33/56* (2006.01)

(52) U.S. Cl.
CPC ............ *F02B 37/18* (2013.01); *B23B 27/148* (2013.01); *B23B 2226/18* (2013.01); *C04B 2235/3208* (2013.01); *C04B 2235/3217* (2013.01); *C04B 2235/3224* (2013.01); *C04B 2235/3225* (2013.01); *C04B 2235/3232* (2013.01); *C04B 2235/386* (2013.01); *C04B 2235/3869* (2013.01); *C04B 2235/3873* (2013.01); *C04B 2235/3886* (2013.01); *C04B 2235/442* (2013.01); *C04B 2235/602* (2013.01); *C04B 2235/6581* (2013.01); *C04B 2235/668* (2013.01); *C04B 2235/75* (2013.01); *C04B 2235/766* (2013.01); *C04B 2235/767* (2013.01); *C04B 2235/77* (2013.01); *C04B 2235/80* (2013.01); *C04B 2235/85* (2013.01); *C04B 2235/96* (2013.01); *F01N 2240/36* (2013.01); *F16C 33/56* (2013.01); *F16C 2206/58* (2013.01); *Y02T 10/144* (2013.01)

(56) References Cited

U.S. PATENT DOCUMENTS

| | | | | |
|---|---|---|---|---|
| 4,975,395 | A | | 12/1990 | Lumby et al. |
| 5,081,079 | A | * | 1/1992 | Ukyo ............... C04B 35/584 428/698 |
| 5,411,923 | A | * | 5/1995 | Suzuki ............. C04B 35/597 501/95.3 |
| 5,424,256 | A | * | 6/1995 | Yoshimura ........ C04B 35/5935 501/97.3 |
| 5,990,026 | A | * | 11/1999 | Baek ................ C04B 35/597 264/666 |
| 6,824,727 | B2 | * | 11/2004 | Roy ................. C04B 35/597 264/414 |
| 7,514,383 | B2 | * | 4/2009 | Bitterlich ......... C04B 35/597 428/698 |

FOREIGN PATENT DOCUMENTS

| | | |
|---|---|---|
| JP | S63-303865 A | 12/1988 |
| JP | H06-305837 | 11/1994 |
| WO | 2014/003150 A1 | 1/2014 |

OTHER PUBLICATIONS

Translation of the International Preliminary Report on Patentability (Chapter I or Chapter II) for PCT/EP2015/079247 dated Jun. 22, 2017 (11 pages).

* cited by examiner

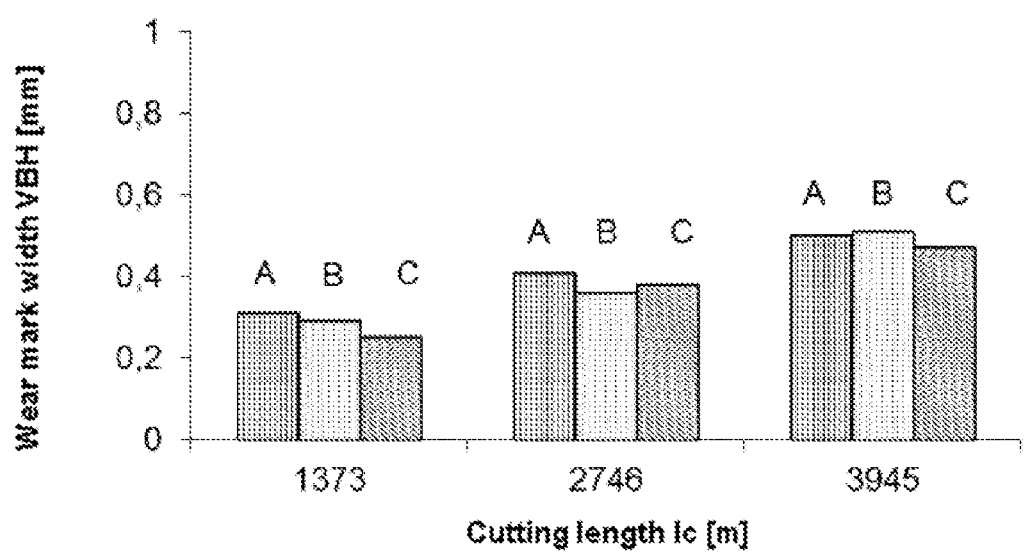

α/β-SIALON HAVING IMPROVED SINTERING ACTIVITY AND HIGH EDGE STRENGTH

CROSS-REFERENCE TO RELATED APPLICATIONS

This application is a U.S. national phase application filed under 35 U.S.C. § 371 of International Application No. PCT/EP2015/079247, filed Dec. 10, 2015, designating the United States, which claims priority from German Patent Application Nos. 10 2014 018 283.5 and 10 2015 222 790.1, filed Dec. 12, 2014 and Nov. 18, 2015, respectively, which are hereby incorporated herein by reference in their entirety for all purposes.

BACKGROUND OF THE INVENTION

The invention relates to α/β-sialon-based materials. In particular, the invention relates to α/β-sialon-based materials having improved sintering activity and high edge strength of the sintered molded articles produced from the materials.

Sintered molded articles composed of α/β-sialon, particularly for use as a cutting tool, for example a cutting insert, are known from the state of the art. The mixture of α-sialon and β-sialon allows the production of sintered molded articles that demonstrate great hardness on the basis of the grainy α-sialon, on the one hand. On the other hand, however, the sintered molded articles also possess good impact resistance on the basis of the needle-shaped β-sialon grains.

For use as a cutting tool, it is required, in addition to sufficient hardness and impact resistance, that the material is also temperature-resistant, because very great heating of the cutting tool can occur locally, particularly when cutting gray cast iron or nickel-based alloys (superalloys), and here, in particular, using a continuous cut. However, many oxidic sintering aids that are present essentially in the glass phase after sintering of the material have only comparatively slight temperature resistance and low heat conductivity. Therefore, overheating quickly occurs locally, and the glass phase softens. Furthermore, oxidation of other components can occur due to the temperature effect, and this can lead to premature failure of the cutting tool, particularly due to spalling that proceeds from the cutting edge, suddenly increased abrasive wear or oxidation of the other components ($Si_3N_4$, sialon or TiN).

If the cutting tool is used in an interrupted cut, the temperatures are lower than in a continuous cut. The cutting insert is not in constant contact with the workpiece, so that it can cool off a little, again and again. However, in an interrupted cut, resistance to cracking and edge stability should be comparatively great, since the mechanical stress is much greater than in a continuous cut.

α/β-sialons having final densities greater than 99% of the theoretical final density are currently either sintered at temperatures above 1750° C. and simultaneously an elevated nitrogen partial pressure or compacted without pressure and with large amounts of oxidic additives.

Sintering under elevated nitrogen partial pressure requires a closed furnace system and, in comparison with sialons sintered without pressure, more energy and gas (nitrogen). For these reasons, pressure-free compaction, for example under nitrogen flow at temperatures below 1750° C., is fundamentally more efficient than gas-pressure sintering.

However, since the type and amount of the oxidic additives determine the high-temperature properties of the sialon ceramic, increased wear is observed during high-temperature applications, such as, for example, when cutting gray cast iron, in the case of sialons compacted without pressure as compared with gas-pressure-sintered sialons.

BRIEF SUMMARY OF THE INVENTION

The task of the invention therefore consists in making available a sialon ceramic that is wear-resistant even at high temperatures and nevertheless can be economically produced. Furthermore, a method for producing this sialon ceramic is supposed to be made available.

This task is accomplished by means of a suitable additive system that guarantees sufficient compaction during pressure-free sintering, for one thing, and does not overly increase the oxygen proportion in the system, for another. As a result, either the wear behavior of sialons sintered without pressure can be raised to the level of those sintered with gas pressure, or the properties of the gas-pressure-sintered sialons can be further improved.

Surprisingly, it was shown that this task can be accomplished by means of the addition of an oxide of the element titanium, particularly with titanium dioxide ($TiO_2$) as the sintering additive. During sintering under a nitrogen atmosphere, titanium dioxide converts completely, in other words at more than 95%, to TiN.

BRIEF DESCRIPTION OF THE DRAWING

FIG. 1 shows the results of the wear test for a gas-pressure-sintered comparison example A and the embodiments B and C according to the invention.

DETAILED DESCRIPTION OF THE INVENTION

This solution of the task set can, in fact, be evaluated as surprising, because according to Petzow & Herrmann (High Performance Non-Oxide Ceramics II, 47-167 (2002)), sintering additives for sialon ceramics under sintering conditions should be stable oxides that do not lead to the decomposition of $Si_3N_4$ with the formation of additive nitrides and $SiO_2$. In this connection, $TiO_2$ is specifically mentioned as a negative example, see p. 81, for example.

Particularly preferably, the oxides of the element titanium are added in an amount of 0.1 to 3 wt.-%. Especially preferably, $TiO_2$ is used as a sintering additive.

In a method according to the invention for producing a sintered molded article from α/β-sialon, having a grain boundary phase that comprises at least one hard material formed in situ, a starting material is used, in addition to the stated sintering additive, which material comprises at least the following compounds: α-$Si_3N_4$, AlN and, if applicable, $Al_2O_3$, as well as at least one further sintering additive selected from oxygen-containing and/or nitrogen-containing compounds of the elements of the rare earths (lanthanoids without promethium), yttrium, scandium, lithium, beryllium; nitrogen-containing compounds of the elements zirconium and/or hafnium; as well as compounds of the elements magnesium, calcium, strontium. Oxides of the elements ytterbium, erbium, dysprosium, yttrium, scandium, cerium; oxides, hydroxides and/or carbonates of the elements magnesium, calcium, as well as nitrides of the elements zirconium and hafnium are preferred. Oxides of the elements ytterbium, cerium, yttrium and/or carbonates of the elements magnesium and calcium are particularly preferred.

Use of $TiO_2$ as a sintering additive is surprisingly possible if the addition of the aluminum that is required for sialons essentially takes place in the form of aluminum nitride (AlN), preferably in a weight ratio of $AlN:Al_2O_3$ greater than 4:1, preferably greater than 10:1, particularly preferably greater than 50:1. Experiments have shown that if the ratio of $AlN/Al_2O_3$ is less than 4:1, α-sialon is not sufficiently stabilized. Furthermore, the oxygen proportion in the grain boundary phase increases, and this has a negative influence on the high-temperature properties of the sintered molded article. The eutectic point in the system is displaced in the direction toward lower temperatures by adding $TiO_2$ and AlN. A eutectic melt phase forms. This melt phase furthermore makes it possible to reduce the explicit additive content and to nevertheless achieve sufficient compaction even during pressure-free sintering.

Ceramic components that were produced using $TiO_2$ as a sintering additive demonstrate less warping and better compaction than components that were compacted using conventional sintering additives such as, for example, larger amounts of AlN, $CaCO_3$ or oxides of the rare earths.

The α-$Si_3N_4$ raw material dissolves in the aforementioned melt phase during the compaction process (sintering). When the solubility limit is exceeded, elongated β-sialon needles and globular α-sialon grains stabilized by rare earths are formed. In this process, $Al^{3+}$ ions of the added AlN are built into the $Si_3N_4$ crystal lattice in place of the $Si^{4+}$ ions. In the case of the β-sialon, for reasons of charge neutrality, an $N^{3-}$ ion must be replaced with an $O^{2-}$ ion for every $Al^{3+}$ that is built in. In the case of the α-sialon, in addition to the $Al^{3+}$ ions, large cations (generally $SEE^{3+}$ ions) are built into the crystal lattice in order to stabilize the α-sialon modification. Here, charge equalization also takes place by means of the installation of $O^{2-}$ ions. By means of this replacement of $N^{3-}$ with $O^{2-}$, the concentration of the $N^{3-}$ ions in the melt is increased and the concentration of the $O^{2-}$ ions is reduced. Because nitrogen-containing grain boundary phases increase the viscosity and the softening temperature, this leads to increased temperature resistance of the sintered molded articles.

The oxidic titanium sintering additive converts at least in part, preferably by more than 95%, to a nitridic hard material, so that the sintered molded article contains hard materials formed in situ. If, for example, $TiO_2$ is added as a sintering additive, the hard material TiN forms in the sintered molded article, and $TiO_2$ can no longer be detected by means of X-ray diffractometry. The remaining sintering aids not built into the sialon crystal structure and/or converted to hard material are present in the sintered molded article in the form of an amorphous and/or partially crystalline grain boundary phase.

A further important property of technical ceramics, particularly in the case of wear applications such as in the case of cutting materials, is the edge strength against spalling $R_{eA}$. The edge strength was essentially determined according to Method A of DIN CEN/TS 843-9:2010-11-01. In deviation from DIN CEN/TS 843-9:2010-11-01, for one thing a testing machine having a precision of 2.5% of the displayed force was used, for another thing, the samples were not held in an unchangeable position, using a clamping device, but rather checked while being freely movable, with the exception of an edge stop. Indexable inserts having the geometry SNMX 120716 T02020 were used for determining the edge strength. The indentation for determining the edge strength took place on what is called the cutting surface. The circumference of the indexable inserts was not hard-treated and was therefore in what is called the as fired state. The shortest distance from the circumference of the indexable insert to the indentation of the diamond used, having a Rockwell geometry, was measured using a light microscope after the spalling force was determined. The higher the edge strength, the higher the cutting speed that can be selected at the same cutting depth and the same advance. This particularly holds true for interrupted cutting, because here, the cutting ceramics are repeatedly subjected to stress with regard to edge stability. According to a particularly preferred further development of the invention, the sintered molded article therefore has an edge strength of at least 600 N/mm. Preferably, the edge strength of the sintered molded article according to the invention lies in the range from 650 to 2000 N/mm, particularly preferably in the range from 900 to 1300 N/mm.

A sintered molded article according to the invention can be produced from the following starting substances: 70 to 96 wt.-% $Si_3N_4$, 3 to 15 wt.-% of at least one oxide of the rare earths or $Y_2O_3$, 1 to 15 wt.-% of an aluminum compound, comprising AlN and, if applicable, $Al_2O_3$, as well as 0.1 to 3 wt.-% of a titanium oxide, preferably $TiO_2$. Further additives are possible, for example hard materials such as TiN, SiC or the like, or further oxidic additives such as MgO, $CaCO_3$, $Li_2O$, etc. However, the sum of the starting substances always amounts to 100 wt.-%.

A particularly preferred embodiment of the invention has a starting material composed of 78 to 95 wt.-% $Si_3N_4$, 2 to 8 wt.-% AlN, 0 to 1.2 wt.-% $Al_2O_3$, 2.5 to 6.5 wt.-% $Y_2O_3$ or 3.3 to 12 wt.-% $Yb_2O_3$ or a corresponding mixture of the two, 0.08 to 0.22 wt.-% $CaCO_3$ and 0.25 to 2.0 wt.-% $TiO_2$, wherein the sum of the starting substances amounts to 100 wt.-%.

As already indicated above, green bodies formed from the starting material can be sintered without pressure or under gas pressure. If the green bodies are sintered without pressure, an advantage of the invention consists in that the sintering activity and thereby the final density of the sintered molded article can be increased by adding an oxide of the element titanium, without having to increase the absolute amount of added sintering additives. In this way, the properties of the variants sintered without pressure can be raised to the level of the properties of the gas-pressure-sintered variants, but at far lower costs.

If the green bodies are gas-pressure-sintered, an advantage of the invention lies in that the wear properties, particularly the oxidation resistance of the ceramics at high application temperatures, can be improved. This improvement is possible because lesser amounts of sintering additives are required for compacting the ceramics, and this in turn leads to a reduced amount of oxidation-susceptible grain boundary phase.

Particularly preferably, the sintered molded articles described are used as a cutting tool, particularly as a cutting insert, as a wear component, for example as a welding roll, welding centering pins, components for bearings (roller bearings or ball bearings), components in an exhaust gas system (exhaust gas flaps), valves or exhaust gas turbochargers.

In the following, the invention will be explained in greater detail using an exemplary embodiment in comparison with a conventionally composed sintered molded article.

The starting materials, see Table 1, were mixed and a green molded article was produced. The molded article was sintered without pressure at 1725° C., for approximately 2 hours, under flowing nitrogen.

TABLE 1

| Starting material | Example A (comparison example) | Example B (according to the invention) | Example C (according to the invention) |
|---|---|---|---|
| $Si_3N_4$ (wt.-%) | 84-93 | 82-92 | 75-88 |
| $Al_2O_3$ (wt.-%) | 0-1.2 | 0-1.2 | 0-1.2 |
| AlN (wt.-%) | 3-8 | 3-8 | 3-8 |
| $Er_2O_3$ (wt.-%) | — | 0-1.2 | — |
| $Y_2O_3$ (wt.-%) | 4.5-6.5 | — | 0-1.2 |
| $Yb_2O_3$ (wt.-%) | — | 8.5-12.5 | 8.5-12.5 |
| $CaCO_3$ (wt.-%) | 0.08-0.22 | 0.08-0.22 | 0.08-0.22 |
| $TiO_2$ (wt.-%) | — | 0.25-2 | 0.25-2 |
| % of theoretical density | 96.36-97.13 | 99.18-99.97 | 99.34-99.98 |
| Vickers Hardness HV10 (GPa) | 5.5 | 16.6 | 16.7 |
| α-sialon proportion of the as fired surface of the sintered molded article (vol.-%) | 77 | 75 | 86 |
| α-sialon proportion in the interior of the sintered molded article (vol.-%) | 64 | 55 | 54 |
| Crack resistance (Palmquist) $K_{Ic}$ ($GPa*m^{0.5}$) | Cannot be evaluated, because no cracks can be seen due to high residual porosity | 6.6 | 6.5 |
| Edge strength $R_{eA}$ (N/mm) | Cannot be evaluated, because parts are too porous and warped | 1054.97 | 946.33 |

The examples according to the invention and the comparison example differ only in their composition, i.e. the materials used. The examples according to the invention have a $TiO_2$ component; the amounts of the other components were adapted accordingly. Method parameters such as shaping and sintering conditions were otherwise identical in the examples.

In all cases, an α/β-sialon sintered molded article occurred, having a grain boundary phase that has not only amorphous components but also crystalline components in the X-ray diffractogram. The sintered molded article of the examples according to the invention furthermore also contained TiN grains formed in situ.

With regard to the properties, it was shown that the examples according to the invention have a relative density that is about 3% higher than the comparison example. This high relative density is also demonstrated in the excellent results that are obtained for Vickers hardness HV10 and crack resistance. The Vickers hardness HV10 accordingly amounts to at least 10 GPa, preferably at least 15 GPa. The crack resistance according to Palmquist accordingly amounts to at least 5 $MPa*m^{0.5}$, preferably at least 6 $MPa*m^{0.5}$, for a sintered molded article according to the invention.

For comparison example A, it was not possible to determine the crack resistance and the edge strength because the crack progression could not be clearly recognized due to the great residual porosity. The experiment regarding edge strength therefore could not be evaluated, since the cutting inserts were too porous and furthermore warped.

In the sintered state of the material, the sialon phase of the sintered article, in the interior, consists of a proportion of α-sialon of 10 to 90 vol.-%, preferably 20 to 70 vol.-%, particularly preferably 30 to 60 vol.-%, and a proportion of β-sialon of 90 to 10 vol.-%, preferably 80 to 30 vol.-%, particularly preferably 70 to 40 vol.-% β-sialon. The proportion of α-sialon and β-sialon is determined using X-ray diffractometry images (according to Gazzara and Messier, J. Am. Ceram. Soc. Bull. 56 (1977)).

It is known that the composition of the material in the interior of a sintered molded article can be varied by means of the production parameters, such as, for example, by means of the composition of the powder mixture, the sintering conditions in the furnace, the crucible material, the type of gas, the temperature, and the sintering time. A gradient between the surface and the interior of the sintered article can be present in the sintered molded article, so that what is called the as fired surface contains up to 100% α-sialon.

The surface of the sintered molded article in the sintered state preferably has a proportion of α-sialon with reference to the entire sialon phase from 50 to 100 vol.-%, preferably from 55 to 95 vol.-%, particularly preferably from 60 to 90 vol.-%, and a proportion of β-sialon from 0 to 50 vol.-%, preferably from 5 to 45 vol.-%, particularly preferably from 10 to 40 vol.-%.

The surface of the sintered molded article in the sintered state preferably has a proportion of α-sialon with reference to the entire sialon phase that is higher by 5 to 65 vol.-%, preferably by 10 to 55 vol.-%, particularly preferably by 15 to 50 vol.-%, than the proportion of α-sialon with reference to the entire sialon phase in the interior of the sintered article.

A gradient can form in the sintered molded article under certain conditions if the surface of the sintered article cools faster than the interior or if the surface is changed in terms of its chemical composition by means of reactions with the atmosphere. An α-sialon-rich surface leads to a harder outer layer having an impact-resistant core. Thereby the hardness of the sintered molded article can be increased further at the surface, in addition to the hard material formed in situ, without reducing the high edge strength of the sintered blank, which is machined to be planar and chamfered.

The material according to the invention can be coated with known wear-reducing layers such as, for example, $Al_2O_3$, TiN, TiC or Ti(C,N), and this increases the wear resistance.

The FIGURE shows the results of the wear test for a gas-pressure-sintered comparison example A and the embodiments B and C according to the invention, which were sintered without pressure, as described above. The width of the wear mark is plotted in millimeters as a function of the cutting length in meters during interrupted cutting of gray cast iron (GJL 150). The wear test was carried out at a cutting speed of 1000 m/min, an advance of 0.50 mm/revolution, and a cutting depth of 2 mm.

At the same cutting length, it is found that the embodiments B and C of the invention, which were sintered without pressure, have comparable or even better wear values than the comparison example A.

The invention claimed is:
1. A sintered molded article comprising a ceramic comprising α/β-sialon having a grain boundary phase, wherein the grain boundary phase contains at least TiN formed in situ as an additional phase from a starting material comprising 70 to 96 wt.-% $Si_3N_4$, 3 to 15 wt.-% of at least one oxide of the rare earths and/or $Y_2O_3$, 1 to 15 wt.-% of an aluminum compound, comprising AlN and, optionally, $Al_2O_3$ in a weight ratio of AlN:$Al_2O_3$ greater than 4:1, 0.1 to 3 wt.-% of $TiO_2$, and $CaCO_3$, wherein the sum of the starting substances corresponds to 100 wt.-%, wherein the sintered molded article has a final density of at least 99%, wherein in the sintered state, in the interior of the sintered molded article, the proportion of α-sialon with reference to the entire sialon phase amounts to 20 to 70 vol.-%, and the proportion of β-sialon amounts to 80 to 30 vol.-%, and wherein the surface of the sintered molded article, in the sintered state, amounts to a proportion of α-sialon with reference to the entire sialon phase from 55 to 95 vol.-%, and the proportion of β-sialon amounts to from 5 to 45 vol.-%.

2. The sintered molded article according to claim 1, wherein the sintered molded article has an edge strength of at least 600 N/mm.

3. The sintered molded article according to claim 1, wherein in the sintered state, in the interior of the sintered article, the proportion of α-sialon with reference to the entire sialon phase amounts to 30 to 60 vol.-%, and the proportion of β-sialon amounts to 70 to 40 vol.-%.

4. The sintered molded article according to claim 1, wherein the surface of the sintered article, in the sintered state, amounts to a proportion of α-sialon with reference to the entire sialon phase from 60 to 90 vol.-%, and the proportion of β-sialon amounts to from 10 to 40 vol.-%.

5. The sintered molded article according to claim 1, wherein the surface of the sintered molded article in the sintered state has a proportion of α-sialon with reference to the entire sialon phase that is higher by 5 to 65 vol than the proportion of α-sialon with reference to the entire sialon phase in the interior of the sintered article.

6. The sintered molded article according to claim 1, wherein the sintered molded article has a Vickers hardness HV10 of at least 10 GPa and/or a crack resistance $K_{Ic}$ of at least 5 MPa*$m^{0.5}$.

7. The sintered molded article according to claim 1, wherein the sintered molded article has an edge strength of at least 680 N/mm.

8. The sintered molded article according to claim 1, wherein the surface of the sintered molded article in the sintered state has a proportion of α-sialon with reference to the entire sialon phase that is higher by 10 to 55 vol.-% than the proportion of α-sialon with reference to the entire sialon phase in the interior of the sintered article.

9. The sintered molded article according to claim 1, wherein the surface of the sintered molded article in the sintered state has a proportion of α-sialon with reference to the entire sialon phase that is higher by 15 to 50 vol.-% than the proportion of α-sialon with reference to the entire sialon phase in the interior of the sintered article.

10. The sintered molded article according to claim 1, wherein the sintered molded article has a Vickers hardness HV10 of at least 15 GPa and/or a crack resistance $K_{Ic}$ of at least 6 MPa*$m^{0.5}$.

11. The sintered molded article according to claim 1, wherein starting material comprises 82 to 88 wt.-% $Si_3N_4$, 8.5 to 13.7 wt.-% of at least one oxide of the rare earths and/or $Y_2O_3$, 3 to 9.2 wt.-% of an aluminum compound, comprising AlN and, optionally, $Al_2O_3$, 0.25 to 2 wt.-% of $TiO_2$, and 0.08 to 0.22 wt.-% $CaCO_3$.

12. A sintered molded article comprising a ceramic comprising α/β-sialon having a grain boundary phase, wherein the grain boundary phase contains at least TiN formed in situ as an additional phase by sintering a starting material without pressure or with gas pressure, the starting material comprising 75 to 92 wt.-% $Si_3N_4$, 3 to 15 wt.-% of at least one oxide of the rare earths and/or $Y_2O_3$, 1 to 15 wt.-% of an aluminum compound, comprising AlN and, optionally, $Al_2O_3$ in a weight ratio of AlN:$Al_2O_3$ greater than 4:1, 0.1 to 3 wt.-% of $TiO_2$, and $CaCO_3$, wherein the sum of the starting substances corresponds to 100 wt.-%, wherein the sintered molded article has a final density of at least 99%, wherein in the sintered state, in the interior of the sintered molded article, the proportion of α-sialon with reference to the entire sialon phase amounts to 20 to 70 vol.-%, and the proportion of β-sialon amounts to 80 to 30 vol.-%, and wherein the surface of the sintered molded article, in the sintered state, amounts to a proportion of α-sialon with reference to the entire sialon phase from 55 to 95 vol.-%, and the proportion of β-sialon amounts to from 5 to 45 vol.-%.

13. The sintered molded article according to claim 12, wherein the sintered molded article has an edge strength of at least 600 N/mm.

14. The sintered molded article according to claim 12, wherein in the sintered state, in the interior of the sintered article, the proportion of α-sialon with reference to the entire sialon phase amounts to 30 to 60 vol.-%, and the proportion of β-sialon amounts to 70 to 40 vol.-%.

15. The sintered molded article according to claim 12, wherein the surface of the sintered article, in the sintered state, amounts to a proportion of α-sialon with reference to the entire sialon phase from 60 to 90 vol.-%, and the proportion of β-sialon amounts to from 10 to 40 vol.-%.

16. The sintered molded article according to claim 12, wherein the surface of the sintered molded article in the sintered state has a proportion of α-sialon with reference to the entire sialon phase that is higher by 5 to 65 vol than the proportion of α-sialon with reference to the entire sialon phase in the interior of the sintered article.

17. The sintered molded article according to claim 12, wherein the sintered molded article has a Vickers hardness HV10 of at least 10 GPa and/or a crack resistance $K_{Ic}$ of at least 5 MPa*$m^{0.5}$.

18. The sintered molded article according to claim 12, wherein the sintered molded article has an edge strength of at least 680 N/mm.

19. The sintered molded article according to claim 12, wherein the surface of the sintered molded article in the sintered state has a proportion of α-sialon with reference to the entire sialon phase that is higher by 10 to 55 vol.-% than the proportion of α-sialon with reference to the entire sialon phase in the interior of the sintered article.

20. The sintered molded article according to claim 12, wherein the surface of the sintered molded article in the sintered state has a proportion of α-sialon with reference to the entire sialon phase that is higher by 15 to 50 vol.-% than the proportion of α-sialon with reference to the entire sialon phase in the interior of the sintered article.

21. The sintered molded article according to claim 12, wherein the sintered molded article has a Vickers hardness HV10 of at least 15 GPa and/or a crack resistance $K_{Ic}$ of at least 6 MPa*$m^{0.5}$.

22. The sintered molded article according to claim 12, wherein starting material comprises 82 to 88 wt.-% $Si_3N_4$, 8.5 to 13.7 wt.-% of at least one oxide of the rare earths and/or $Y_2O_3$, 3 to 9.2 wt.-% of an aluminum compound, comprising AlN and, optionally, $Al_2O_3$, 0.25 to 2 wt.-% of $TiO_2$, and 0.08 to 0.22 wt.-% $CaCO_3$.

* * * * *